（12) United States Patent
Hernandez et al.

(10) Patent No.: US 7,161,767 B2
(45) Date of Patent: Jan. 9, 2007

(54) WIRELESS SUSPENSION DESIGN WITH GROUND PLANE STRUCTURE

(75) Inventors: Manuel A. Hernandez, San Jose, CA (US); Yen Fu, San Jose, CA (US)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 148 days.

(21) Appl. No.: 10/195,471

(22) Filed: Jul. 16, 2002

(65) Prior Publication Data

US 2004/0012889 A1 Jan. 22, 2004

(51) Int. Cl.
*G11B 5/48* (2006.01)
*G11B 21/21* (2006.01)

(52) U.S. Cl. .................. 360/245.9; 360/246; 360/244.3
(58) Field of Classification Search ............. 360/245.8, 360/245.9, 246, 244.3, 264.2
See application file for complete search history.

(56) References Cited

U.S. PATENT DOCUMENTS

| 4,720,690 A | 1/1988 | Popek et al. ................... 333/1 |
| 5,680,274 A | 10/1997 | Palmer ........................ 360/104 |
| 5,883,758 A | 3/1999 | Bennin et al. ............... 360/104 |
| 6,133,805 A | 10/2000 | Jain et al. ........................ 333/1 |
| 6,268,981 B1 | 7/2001 | Coon et al. ............... 360/244.3 |
| 6,493,190 B1 * | 12/2002 | Coon ....................... 360/245.9 |
| 6,785,094 B1 * | 8/2004 | Arya et al. ............... 360/244.3 |

FOREIGN PATENT DOCUMENTS

JP 02236804 A * 9/1990

\* cited by examiner

*Primary Examiner*—William J. Klimowicz
(74) *Attorney, Agent, or Firm*—Kenyon & Kenyon LLP

(57) ABSTRACT

Methods and devices are described that provide improved electromagnetic interference (EMI) protection for suspension assemblies. In one embodiment, a ground line is provided among the traces that are used in the suspension. Alternatively, a top ground plane is provided on top of the conductive traces with an interposed insulative layer. The ground line and/or the top ground plane provide EMI protection for read and write signals traveling through the traces (e.g., read and write traces) of the suspension assembly. The ground line and/or the top ground plane reduce the interaction between the read and the write traces, thus minimizing cross talk.

6 Claims, 8 Drawing Sheets

Fig. 8

WIRELESS SUSPENSION DESIGN WITH GROUND PLANE STRUCTURE

FIELD OF THE INVENTION

The present invention pertains to suspension designs for use in hard disk drives and the like. More particularly, the present invention pertains to electromagnetic interference (EMI) protection in suspension assemblies for hard disk drives.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

Figure 1:
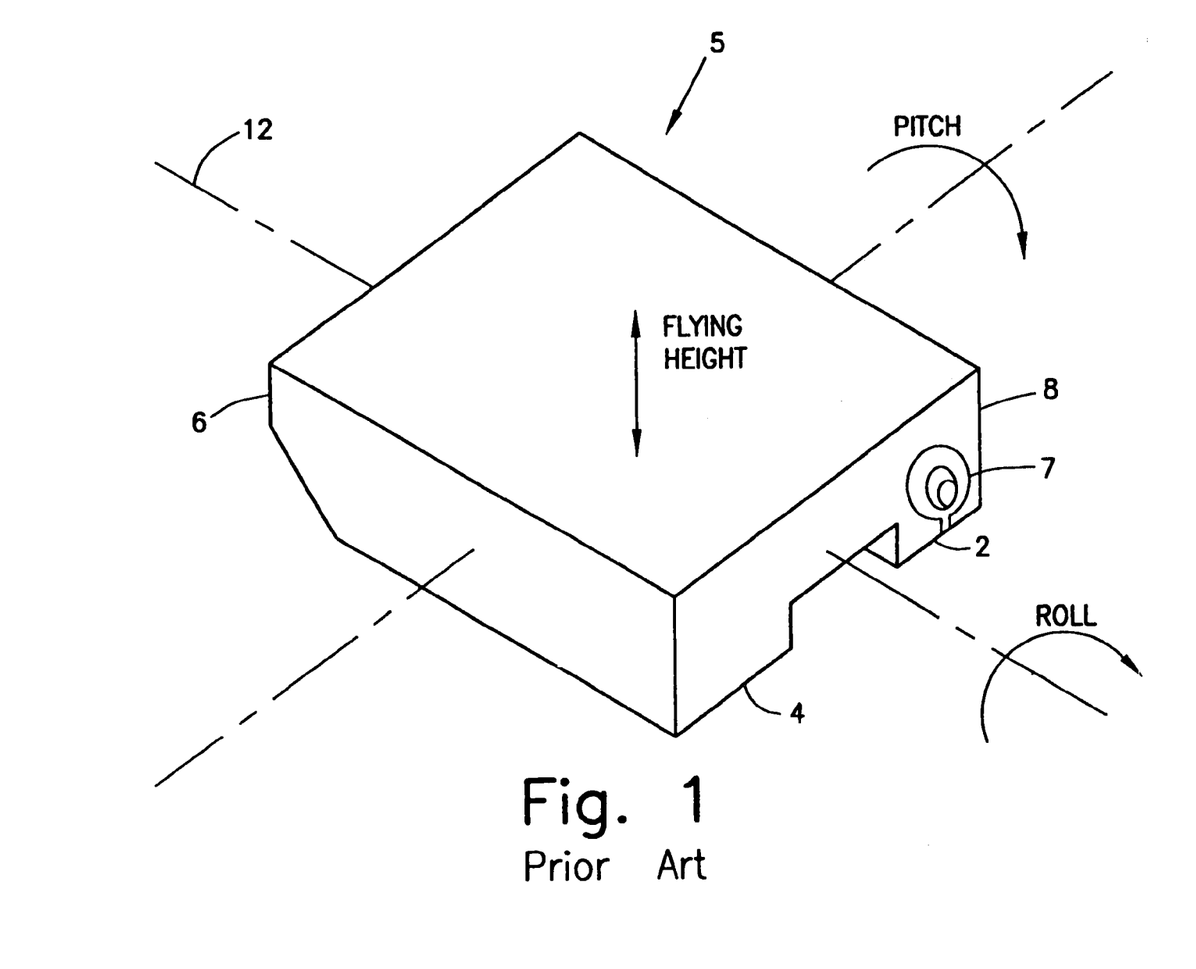
FIG. 1 is a perspective view of a slider device with a read/write head that is known in the art.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

Figure 2:
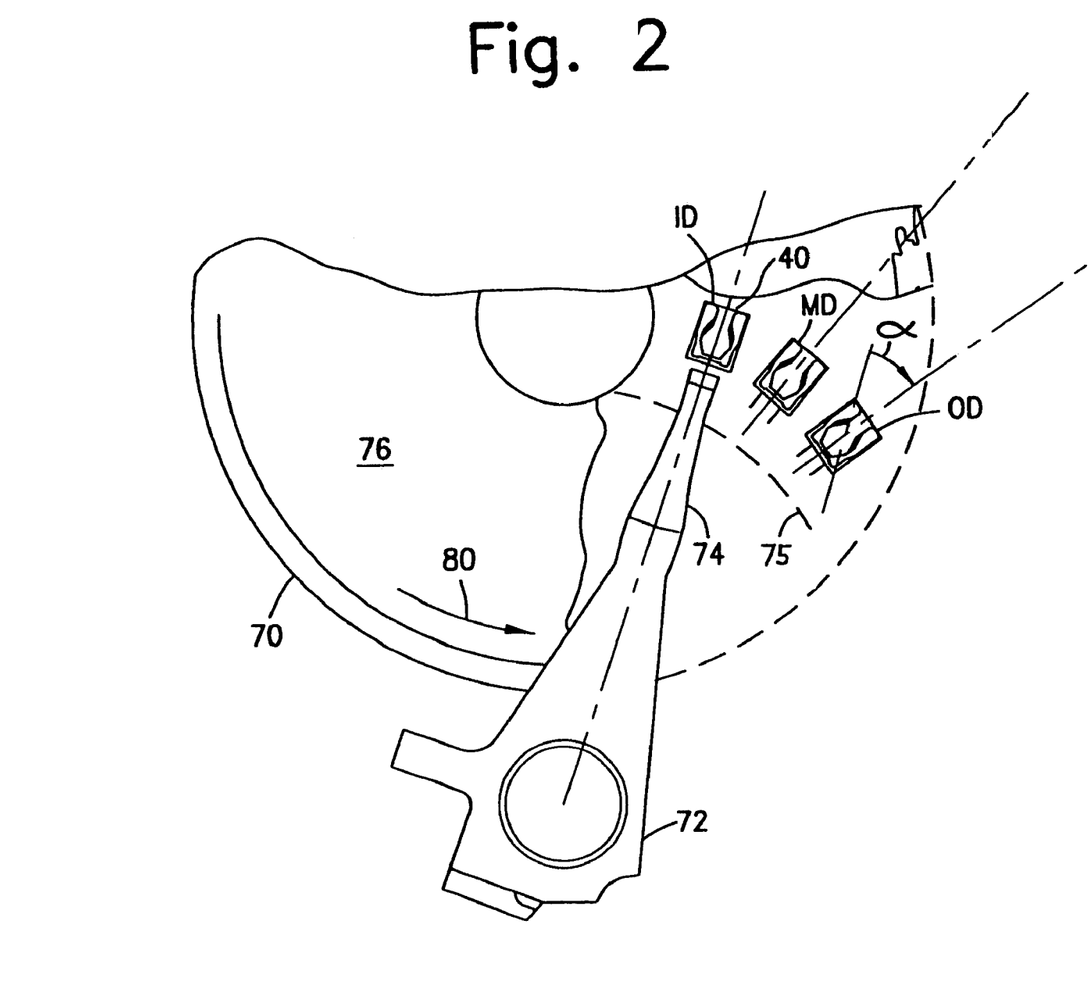
FIG. 2 is a perspective view of a disk drive device that is known in the art.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 75.

A preamplifier is typically connected to the head to supply write currents to the write head and receive currents from the read head. The suspension provides two functions: mechanical support and electrical connection between the head and the preamplifier. Rather than using physical wires to connect the head to the preamplifier, metal traces on the suspension are quite often used.

In the art, there are typically two types of wireless suspensions. In the first type, such as trace suspension assemblies (TSAs) and circuit integrated suspension (CISs), traces are built though a subtractive process (e.g., an etching operation) or through an additive process (e.g., a plating or deposition process) on the stainless steel flexure, with an insulative layer between the trace and the flexure. After the traces are set in place, the flexure can then be welded to other parts of the suspension. In the second type, such as flex suspension assemblies (FSAs) and flex on suspension (FOS), the traces are built on an insulation layer and then covered with another insulation layer to form a flex circuit. This circuit is then attached to the suspension with adhesive. Alternatively, an additional metal layer called a ground plane can be attached to the flex circuit before it is adhered to the suspension.

Typically four traces are supplied for a single head: one pair for the connection between the read head and the pre amplifier and one pair for the connection between the write head and the preamplifier. In the art, it is known that the stainless steel flexure, the suspension, and the ground plane (if one is provided) may provide some protection against electromagnetic interference (EMI). If this protection is not sufficient, then EMI can cause errors to occur in the data stream. Thus, there is a need for an improved system for controlling EMI in a suspension assembly.

SUMMARY OF THE INVENTION

According to an embodiment of the present invention, a suspension assembly is provided with one or more additional traces to provide EMI protection for the read and write traces. In an alternative embodiment, a separate ground plane coupled near the read and write traces provides the EMI protection.

DETAILED DESCRIPTION

Figure 3:
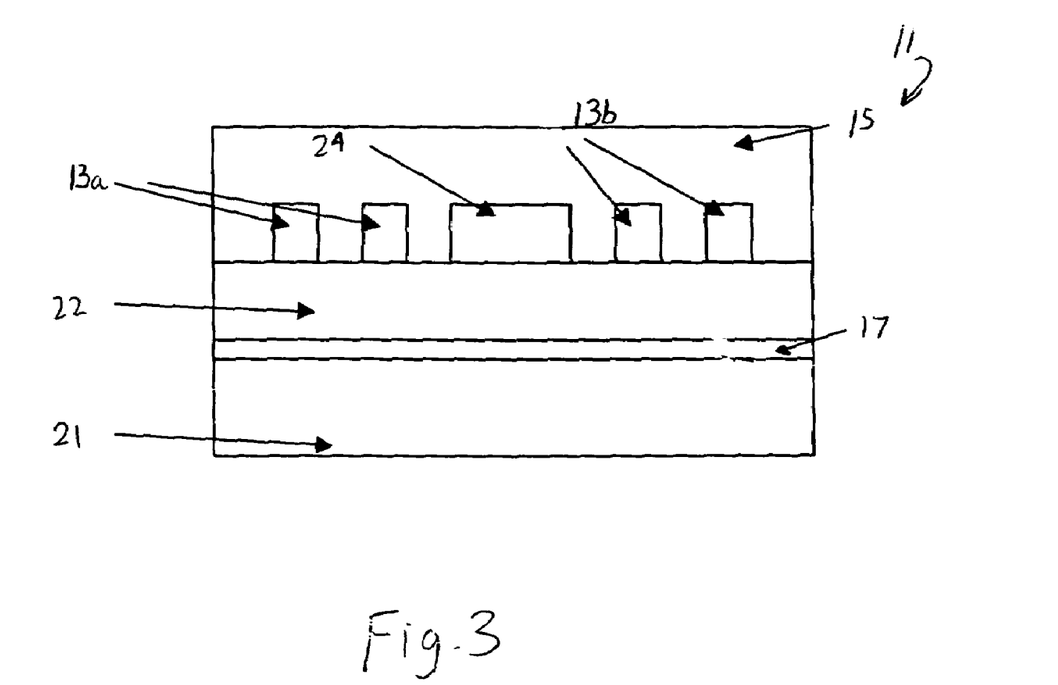
FIG. 3 is cross-sectional view of a wireless suspension according to an embodiment of the present invention.

Referring to FIG. 3, a cross section perpendicular to the traces of a suspension assembly constructed according to an embodiment of the present invention is shown. In FIG. 3, a variety of traces 13a, 13b are provided in a suspension assembly 11. Because the traces are electrical signal conductors, their interconnection with the head and preamplifier can lead to adverse effects. First, the electrical impedance of the traces can affect the amount and speed of the current traveling to the head in the write traces 13a and the magnitude of the read-back signal transmitted back to the read input of the pre-amplifier. Second, the read trace 13b can sense the write current going though the adjacent write trace and produce current through the read head (i.e., cross talk). Third, the read trace can pick up stray EM fields in the drive and produce noise in the read back signal, which generates errors in the data retrieval process.

Referring to FIG. 3, the flexure 21 may be made of stainless steel (for example). The flexure 21 and/or metal plane 17 may serve as ground planes for the traces 13a and 13b. The main function of the ground plane in this embodiment is impedance control, though it may also provide some benefits in noise and cross talk reduction. An insulation layer 22 is provided on top of the metal plane 17 to provide electrical insulation between the flexure 21 with ground plane 17 and the traces 13a, 13b. According to an embodiment of the present invention, a ground line 24 is provided between the first pair of traces 13a and the second pair of traces 13b. The ground line may be provided in a manner similar to the traces (e.g., in TSA and FSA suspensions). In this embodiment the suspension assembly is provided with a top insulation layer 15 that covers each of the traces 13a and 13b along with the ground line 24. Ground line 24 may be coupled to ground plane 17, flexure 21 or a separate grounding source.

Figure 4A:
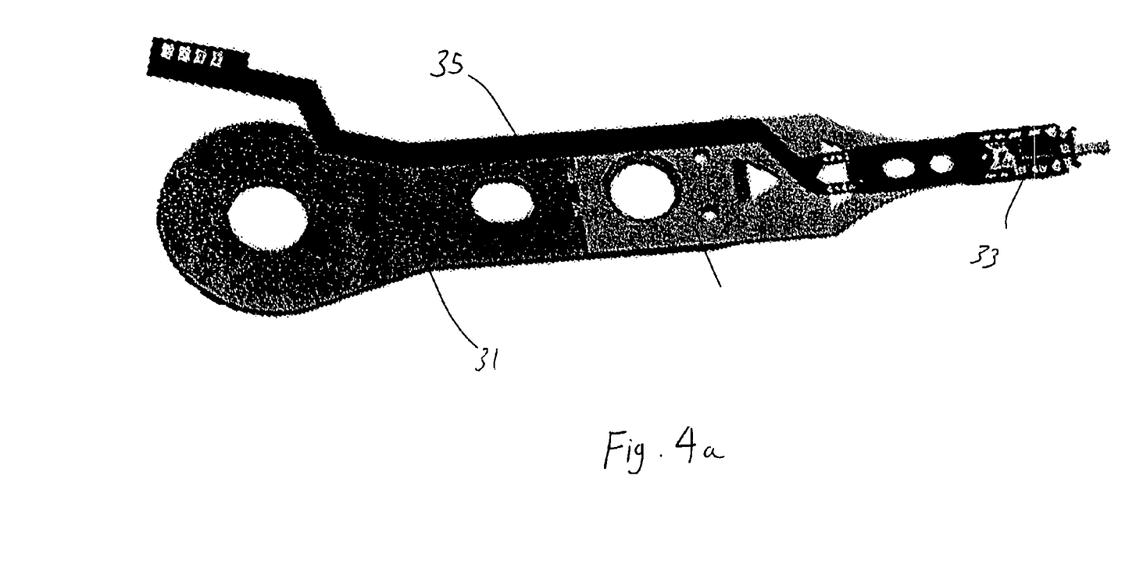
FIGS. 4a and 4b are top views of a suspension assembly according to an embodiment of the present invention.
Figure 4B:
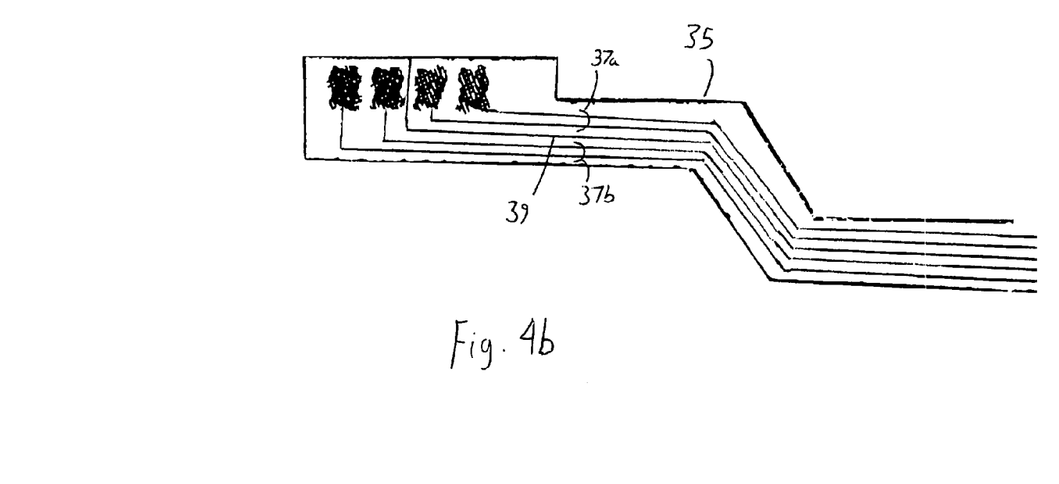

Referring to FIGS. 4a–b, top views of a suspension assembly are shown. In FIG. 4a, the suspension assembly 31 includes a slider 33 and a flex circuit 35. In FIG. 4b, a portion of the flex circuit 35 of FIG. 4a is shown. The flex circuit 35 includes a pair of read traces 37a and a pair of write traces 37b with a ground line 39 positioned between the two pairs of traces 37a, 37b. As described above, the ground line 39 provides EMI protection for the two pairs of traces 37a, 37b.

Figure 5:
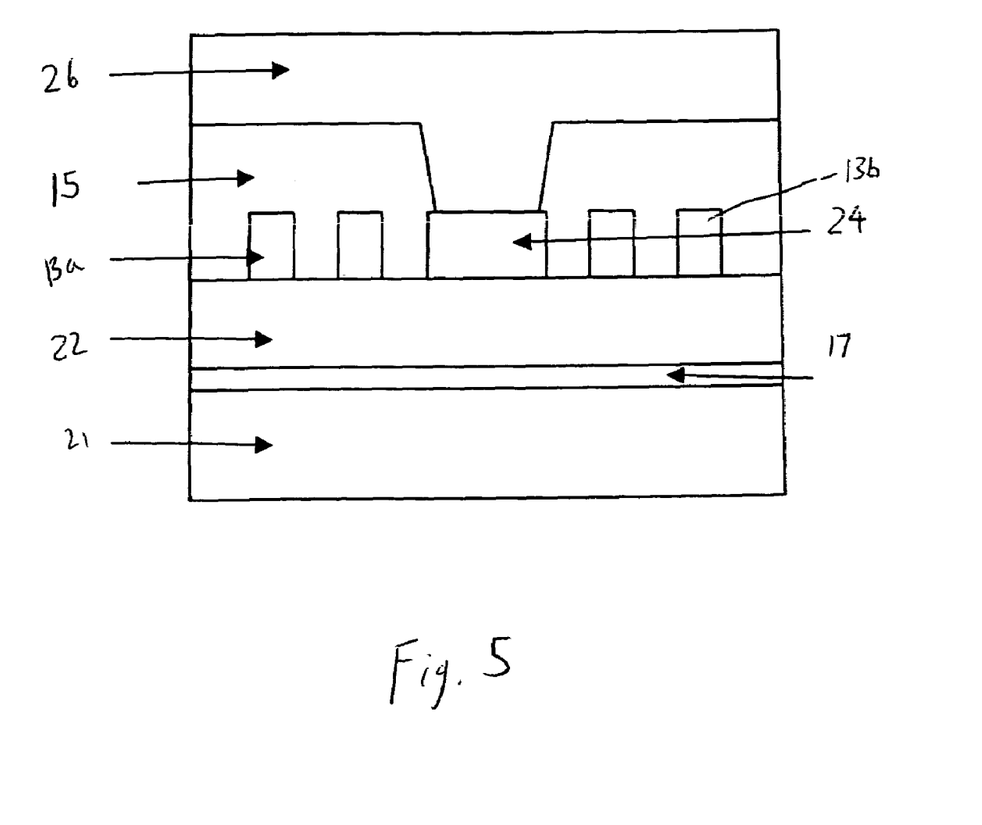
FIG. 5 is a cross-sectional view of a wireless suspension according to another embodiment of the present invention.

Referring to FIG. 5, a cross section of another suspension assembly is shown. In this embodiment, the top insulation layer 15 is etched or deposited in such a manner that the ground line 24 is exposed. A top ground plane 26 can then be provided on top of the top insulation layer 15 and the ground line 24.

Figure 6:
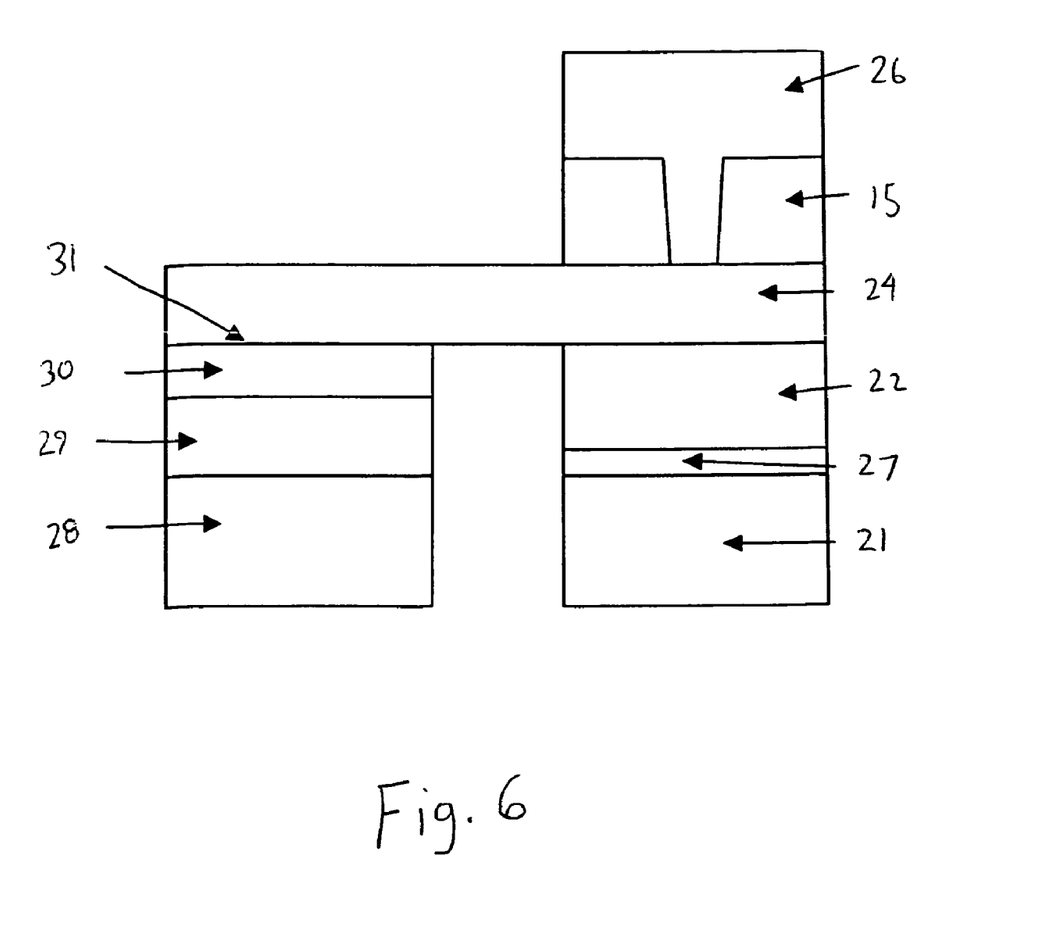
FIG. 6 is a cross-sectional view of a wireless suspension according to another embodiment of the present invention.

Referring to FIG. 6, a cross section, parallel to the traces, of another suspension assembly is shown constructed according to an embodiment of the present invention. In this embodiment a preamp ground connection 30 is provided on an insulation layer 29 and a support base 28. The ground connection 30 can be coupled to the ground line 24 with solder 31. The ground connection 30 may be coupled to the ground line 24 using a variety of other methods including ultrasonic bonding. In the suspension assembly of FIG. 6, a section of the ground line 24 is isolated from the top insulation layer 15, bottom insulation layer 22, top ground plane 26 and bottom ground plane 21 and 27.

Figure 7:
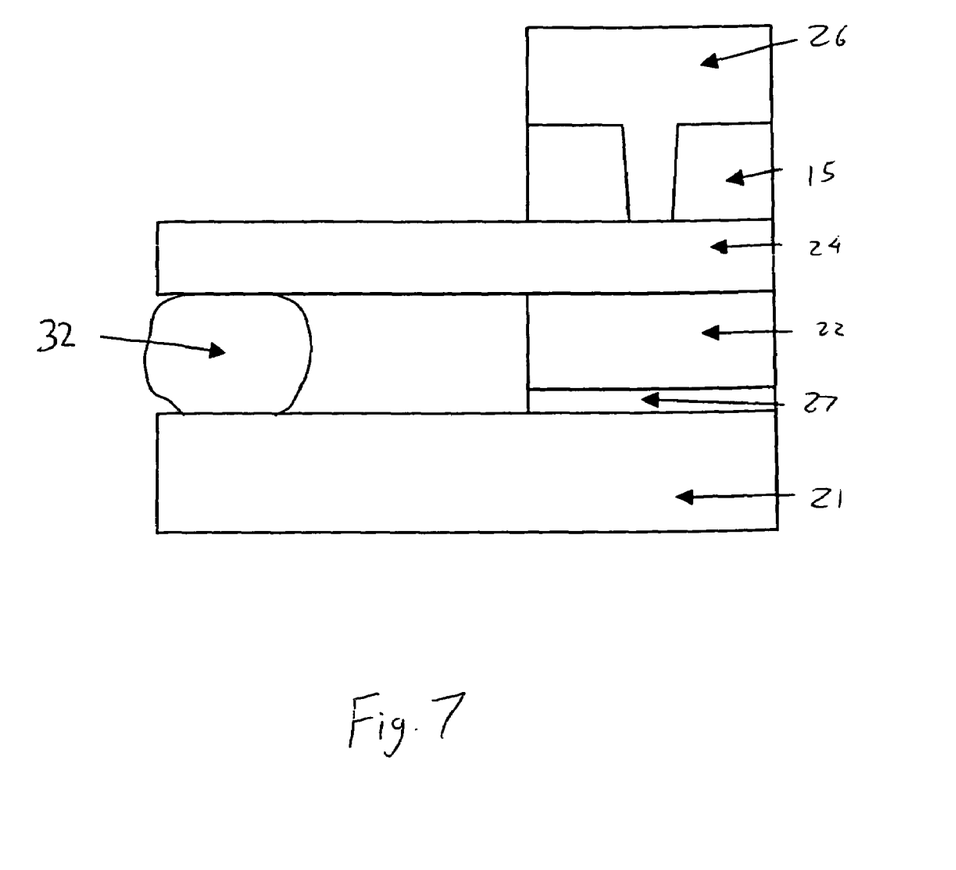
FIG. 7 is a cross-sectional view of a wireless suspension according to another embodiment of the present invention.

Referring to FIG. 7, a similar cross section of a suspension assembly to that presented in FIG. 6 is shown. In this example, a preamp ground is not provided. Instead, the ground line 24 is connected to the stainless steel structure of the flexure 21 with a conductive adhesive 32, or other conductive material.

Figure 8:
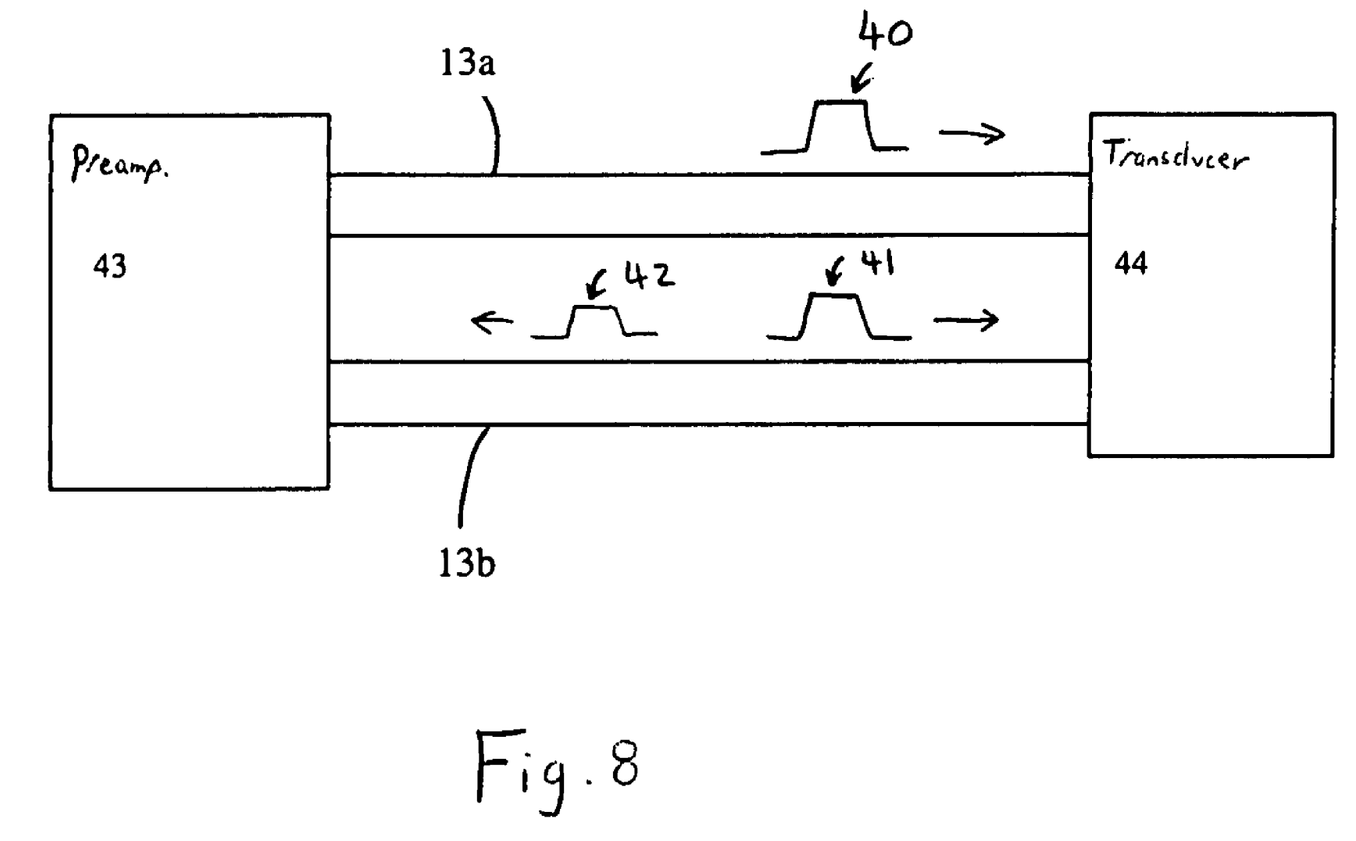
FIG. 8 is an illustration of cross talk signal induced by a write signal.

Referring to FIG. 8, an example of cross talk induced by a write signal is shown. In this example, the coefficient of "forward" cross talk 41 (in seconds/meter) represents the cross talk in the read trace 13b traveling in the same direction as the write signal 40 in the write trace 13a, which induced thecross talk. The magnitude of the cross talk is equal to the magnitude of the write signal multiplied by the forward cross talk coefficient and the length of the trace, from the preamplifier 43 to the transducer 44, and divided by the rise time of the signal. The coefficient of "backward" cross talk 42 is a unitless coefficient that represents the cross talk in the read trace 13b traveling in the opposite direction as the write signal 40, which induced the cross talk. The magnitude of the cross talk signal is equal to the magnitude of the write signal multiplied by this coefficient.

Using a standard wireless suspension design, the use of a ground line according to embodiments of the present invention may result in a significant reduction in cross talk between the pairs of traces 13a and 13b. As shown in Table I, the cross talk coefficients in the forward and backward directions are shown for three examples—a wireless suspension with a ground plane only, a ground plane and ground line (e.g., ground line 24), a ground plane, a ground line, and a top ground plane (e.g., top ground plane 26).

TABLE I

| Wireless Suspension | Fwd. Cross Talk C | Bkwd Cross Talk C |
|---|---|---|
| Bottom Ground Plane 27 Only | $-2.5 \times 10^{-11}$ | $3.5 \times 10^{-3}$ |
| Bottom Ground Plane 27 and Ground Line 24 | $-2.0 \times 10^{-11}$ | $2.8 \times 10^{-3}$ |
| Ground Plane 27, Ground Line 24, and Top Ground Plane 26 | $-1.6 \times 10^{-17}$ | $3.7 \times 10^{-9}$ |

From Table I, the cross talk coefficient is reduced by approximately 20% when a ground line is used. A much more significant reduction is seen when a top ground plane is used with a ground line and bottom ground plane. It is noted that the suspension designs of the present invention may have a significant effect on reducing noise pick up in the pairs of traces 13a and 13b. Furthermore, the grounding system of the present invention may reduce electrostatic discharge (ESD) damage to the suspension. This is due, in part, to the presence of the top ground plane preventing friction induced charging on the insulation layer (e.g., layer 15) in the suspension. Also, the grounding system of the present invention may provide a wide range of impedance in the pairs of traces 13a and 13b in part because the ground planes increase the capacitance of the traces and lower the impedance beyond what single ground can provide.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables.

Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A suspension assembly comprising:
   a suspension;
   a bottom insulative layer provided on top of said suspension;
   at least one signal trace provided on top of said insulative layer;
   a ground line provided on top of said insulative layer; and
   a bottom ground plane, separate from said suspension, positioned between said suspension and said bottom insulative layer, said bottom around plane coupled to said ground line.

2. The suspension assembly of claim 1 wherein said suspension is made of stainless steel.

3. A suspension assembly comprising:
   a suspension;
   a bottom insulative layer provided on top of said suspension;
   a least two pairs of signal traces provided on top of said insulative layer; a ground line positioned between said two pairs of signal traces;
   a top insulative layer positioned on top of said pairs of signal traces and said ground line; and
   a top ground plane positioned on top of said top insulative layer, wherein said top ground plane is directly coupled to said ground line through said top insulative layer.

4. The suspension assembly of claim 3 wherein said suspension is made of stainless steel.

5. A suspension assembly comprising:
   a suspension;
   a bottom insulative layer positioned on said suspension;
   at least one conductive trace positioned on said bottom insulative layer;
   a top insulative layer positioned on said conductive trace and said bottom insulative layer;
   a ground line positioned between said top and bottom insulative layers;
   a top ground plane positioned on top of said top insulative layer, wherein said top ground plane is directly coupled to said ground line through said top insulative layer.

6. The suspension assembly of claim 5 wherein said suspension is made of stainless steel.

* * * * *

UNITED STATES PATENT AND TRADEMARK OFFICE
CERTIFICATE OF CORRECTION

PATENT NO. : 7,161,767 B2  Page 1 of 1
APPLICATION NO. : 10/195471
DATED : January 9, 2007
INVENTOR(S) : Hernandez et al.

It is certified that error appears in the above-identified patent and that said Letters Patent is hereby corrected as shown below:

Column      Line
  5           19     Change "around" to --ground--.

Signed and Sealed this

First Day of May, 2007

JON W. DUDAS
*Director of the United States Patent and Trademark Office*